United States Patent [19]

Harris et al.

[11] Patent Number: 4,622,155

[45] Date of Patent: Nov. 11, 1986

[54] METHOD FOR FRACTURING SUBTERRANEAN FORMATIONS

[75] Inventors: Lawrence E. Harris; Marlin D. Holtmyer; Richard W. Pauls, all of Duncan, Okla.

[73] Assignee: Halliburton Company, Duncan, Okla.

[21] Appl. No.: 764,972

[22] Filed: Aug. 12, 1985

Related U.S. Application Data

[63] Continuation of Ser. No. 589,188, Mar. 13, 1984, abandoned.

[51] Int. Cl.$^4$ .............................................. E21B 43/26
[52] U.S. Cl. .................................. 252/8.551; 166/308
[58] Field of Search ........... 252/8.55 R, 8.5 M, 315.1; 166/308

[56] References Cited

U.S. PATENT DOCUMENTS

3,757,864  9/1973  Crawford et al. .................. 166/308
4,174,283  11/1979  Griffin ................................. 252/8.55
4,200,539  4/1980  Burnham et al. .................. 252/8.55
4,200,540  4/1980  Burnham ............................ 252/8.55
4,316,810  2/1982  Burnham ............................ 252/8.55

Primary Examiner—Herbert B. Guynn
Attorney, Agent, or Firm—Robert A. Kent

[57] ABSTRACT

The present invention provides a method of forming an easily pumpable gelled fluid which is capable of yielding an apparent viscosity of in excess of about 100 centipoise at a shear rate of 40 sec$^{-1}$ for in excess of about six hours at a temperature in excess of 250° F. An initial gel is formed by adding a selected basic aluminum compound and a phosphoric acid ester to a hydrocarbon liquid. This mixture is aged to form the initial gel and an additional quantity of a basic aluminum compound then is admixed with the initial gel. The crosslinked gel then is introduced into a subterranean formation at a rate and pressure sufficient to fracture the formation.

13 Claims, 1 Drawing Figure

METHOD FOR FRACTURING SUBTERRANEAN FORMATIONS

This is a continuation of application Ser. No. 589,188, filed Mar. 13, 1984, now abandoned.

This invention relates to methods for fracturing subterranean formations to enhance oil and gas production, and more particularly, to methods for fracture stimulation of either or both oil and gas wells in which the temperature at the location where the fracture is to be stimulated is in excess of about 200° F.

Hydraulic fracturing is a widely used method for stimulating petroleum producing subterranean formations. Fracturing is commonly performed by contacting a subterranean formation with a viscous fracturing fluid having particulated solids, hereinafter referred to as propping agents, suspended therein, applying sufficient pressure to the fracturing fluid to open a fracture in the subterranean formation and maintaining this pressure while injecting the fracturing fluid into the fracture at a sufficient rate to extend the fracture into the subterranean formation. When the pressure on the fracturing fluid is reduced, the propping agent prevents the complete closure of the fracture.

Viscous liquids are desirably used as fracturing fluids because they have been found to remain in the fracture long enough to permit buildup and maintenance of sufficient pressure to open a fracture. Additionally, a viscous fracturing fluid can support propping agents suspended therein.

A significant problem is encountered where the bottom hole temperature or the environmental temperature at the locus of the fracture which is to be propagated or enlarged exceeds about 200° F. At such elevated temperature, many types of fluids introduced into the formation for the purpose of fracturing the formation undergo a reduction in viscosity, and therefore in their fracturing capability. For example, significant decreases in viscosity at temperatures exceeding 200° F. have been observed in the case of fracturing fluids prepared from hydratable polysaccharides and hydratable polyacrylamides. If an attempt is made to increase the viscosity of an oil base fracturing fluid as it is made up and prior to pumping it into the subterranean location, the increased viscosity results in difficulty in pumping the fluid, and other problems also are encountered in handling the relatively high viscosity fluid at the surface. These difficulties are especially acute where it is undertaken to add a solid propping agent to the fracturing fluid.

In one specific type of formation fracturing which heretofore has been practiced, an oil base fracturing fluid which consists essentially of a refined hydrocarbon containing an aluminum aliphatic phosphate has been used, and the fracturing method is carried out as described in U.S. Pat. No. 3,757,864. The fracturing fluid is prepared in the form of a pumpable gel by mixing the hydrocarbon with an aluminum salt of an aliphatic phosphate, and after the gel has been permitted to age for a selected period of time, the fracturing fluid is pumped downhole to the location of the formation to be fractured and, by application of pressure, a fracture then is developed or propagated due to the hydraulic pressure exerted by the fluid. The effectiveness of the fracturing treatment is directly related to the viscosity of the gel utilized. Generally, fracturing treatments are more effective when the viscosity of the fluid used is higher. The described oil base fracturing fluid containing an aluminum salt of an aliphatic phosphate is usually limited in the concentration of the aluminum salt gelling agent to about 20 to about 200 pounds while it has been disclosed that the gelling agent can be present in an amount of up to about 400 pounds per 1000 gallons of fluid, since above this concentration, the viscosity of the gel becomes sufficiently high that the fluid is very difficult or impossible to manipulate on the surface, and is difficult to pump into the well conduit and into the formation. The recommended concentration of the aluminum salt depends upon the type of oil base liquid utilized. When the concentration of the aluminum salt gelling agent is maintained at a level sufficient to produce a fluid viscosity in the range of 100-500 centipoise, which is tolerable from the standpoint of handling and pumping, a significant decrease in the viscosity of the fluid generally is experienced when this fracturing fluid is introduced into a formation having a temperature above about 150° F.

The present invention relates to a method for fracturing subterranean formations which are at relatively higher temperatures, that is, above 125° F. The method is especially effective for fracturing formations in which the temperature at the location to be fractured exceeds about 200° F.

BRIEF DESCRIPTION OF THE DRAWINGS

The single drawing FIGURE diagrammatically illustrates the method of the present invention.

SUMMARY OF THE INVENTION

The method of the invention can be broadly described as initially forming an aged gel by blending an aluminum salt of a phosphate ester with a hydrocarbon base liquid in a sufficiently low concentration of salt to enable the apparent viscosity of the gel to remain in the range of 100-500 centipoise at a shear rate of 40 sec$^{-1}$ so that the gel can be relatively easily handled and pumped. To the aged gel then is added a quantity of a basic aluminum compound which results in additional crosslinking of the gel to yield a higher viscosity fluid at elevated formation temperatures. The preparation of the gel, and the addition of the basic aluminum compound is carried out at above-ground ambient temperatures and, in any event, at a temperature which is less than about 125° F. After formulation, it is pumped downhole to the subterranean formation to be fractured, and is employed, while under elevated pressure, for creating or propagating a fracture in the formation. At the relatively higher temperature of the formation, and particularly at a temperature above about 200° F., the fracturing fluid substantially maintains its viscosity.

DESCRIPTION OF THE PREFERRED EMBODIMENT

When the described procedure for fracturing of the present invention is employed, no difficulty is encountered in handling and pumping the materials required to make up the fluid at the ambient temperatures generally encountered at the surface over the formation to be fractured. Moreover, the additional crosslinking of the fluid effectively maintains the viscosity of the fluid at a level sufficient to effectively transport a propping agent at the higher temperatures encountered at the underground fracturing location. Surprisingly, the higher viscosity fracturing fluid does not break down or become deleteriously affected at temperatures even as high as about 250° F. By controlling the quantity of the basic aluminum compound added to the aged gel in making up the fluid, the viscosity of the gel can be selectively determined and controlled.

The methods by which the aged gel prepared in the initial steps of the process of the invention is made up are generally well known in the art. One such procedure is that described in *Industrial and Engineering Chemistry*, Vol. 34, page 20 et seq. Other methods are alluded to in U.S. Pat. No. 3,757,864. In general, the procedure entails reacting a phosphorous compound, such as phosphorous pentoxide or phosphorous oxychloride, with a selected alcohol or mixture of alcohols to form the phosphoric acid ester precursor of the salt desired. The ester then is reacted with a basic aluminum compound. Typical usable aluminum compounds are sodium aluminate, aluminum isopropoxide, hydrated alumina, and any other aluminum compound which is capable of reacting with the ester.

The aluminum salt as thus synthesized is next added, also in accordance with well understood procedures, to an oil base or hydrocarbon-type liquid suitable for use in fracturing. The hydrocarbon liquid can be any of various previously used hydrocarbon materials, including kerosene, diesel oil, gas oil, fuel oil and certain types and mixtures of crude oil. Crude oil having in excess of 40 API gravity, condensates, kerosene and diesel are the preferred base materials. The salt can be made up prior to adding to the hydrocarbon liquid, or can be formed in situ by addition of the phosphate ester and aluminum compound concurrently to the hydrocarbon liquid with concurrent mixing.

The amount of the aluminum salt placed in the hydrocarbon liquid in making up the initial aged gel in the preliminary steps of the process can be varied in accordance with a number of factors. In general, however, the concentration of the aluminum salt in the hydrocarbon liquid should be sufficient to yield an apparent viscosity to the fluid in the range of from about 100 to about 500 centipoise at a shear rate of 40 sec$^{-1}$. If the prescribed concentrations are exceeded, the viscosity of the aged gel under preparation may be so high that the gel will be very difficult to handle, and to pump to the subterranean fracture location, and one of the major objectives of the invention will thus be largely defeated.

The aluminum salts used in initially making up the aged gel, in practicing the method of the invention, are broadly aluminum aromatic phosphates, aluminum oxaalkyl phosphates, aluminum oxaalkyl alkyl phosphates and the aluminum aliphatic salts described in Crawford U.S. Pat. No. 3,757,864. The salts employed in the preparation of the aged gel are selected from the group of salts having the structural formulae:

(1)

where
a=0 to 2,
b=1 to 3,
and the sum of a+b=3;
R$_1$=an aryl or aliphatic-aryl group containing from 6 to 24 carbon atoms, and

R$_2$=an aryl, aliphatic-aryl or aliphatic group containing from 1 to 24 carbon atoms, or H;
provided, however, that where R$_1$ is an aryl group, then R$_2$ must be either an aliphatic group containing at least six carbon atoms, or an aliphatic-aryl group containing at least twelve carbon atoms; and provided that if R$_2$ is an aryl group, then R$_1$ is an aliphatic-aryl group containing at least 12 carbon atoms; and provided that if both R$_1$ and R$_2$ are aliphatic-aryl groups; one of R$_1$ and R$_2$ contains at least 12 carbon atoms; and provided that where R$_1$ is an aliphatic-aryl containing less than 12 carbon atoms and R$_2$ is aliphatic, R$_2$ must contain at least six carbon atoms; and (2)

where
a=0 to 2,
b=1 to 3,
c=1 to 5,
d=1 to 5,
and the sum of a+b=3;
R$_1$O and R$_3$O=an alkyloxy, alkenyloxy or alkynyloxy group containing from 1 to 18 carbon atoms, or CH$_2$CH(CH$_3$)O, or CH$_2$CH$_2$O, and
R$_2$O and R$_4$O=an alkyloxy, alkenyloxy or alkynyloxy group containing from 1 to 18 carbon atoms.

R$_1$O and R$_2$O may differ from each other but shall together contain from 1 to 24 carbon atoms, and R$_3$O and R$_4$O may differ from each other but shall together contain from 1 to 20 carbon atoms, provided that at least one of R$_1$O and R$_3$O shall be either CH$_2$CH(CH$_3$)O or CH$_2$CH$_2$O and provided further that where either R$_1$O or R$_3$O is neither CH$_2$CH(CH$_3$)O nor CH$_2$CH$_2$O, then the respective R$_2$O or R$_4$O group otherwise bonded thereto shall be deleted; and (3)

where
m=1 to 3,
n=0 to 2,
and the sum of n+m=3; and
R and R$_1$ are independently C$_1$ to C$_{20}$ alkyls, or C$_2$ to C$_{20}$ alkenyls, or C$_2$ to C$_{20}$ alkynyls, or R or R$_1$, but not both, may be H;
provided, however, that where either the R or R$_1$ contains fewer than six carbon atoms, then the other of R or R$_1$ contains at least seven carbon atoms.

The aluminum aromatic phosphates having the structural formula (1) appearing above include aluminum aryl phosphates, aluminum aliphatic-aryl phosphates, aluminum aryl aliphatic phosphates, aluminum aliphatic-aryl aliphatic phosphates and aluminum aryl aliphatic-aryl phosphates. In these compounds the term "aliphatic" is used to mean saturated, olefinic and/or acetylenic straight and/or branched chain constituents. The term "aryl" is defined as a phenyl group, and the term "aliphatic-aryl" is defined as including phenyl groups substituted by an aliphatic hydrocarbon substituent as this term is defined. In each case, the aromatic phosphate constituting the precursor of the aluminum salts includes an aryl or aliphatic hydrocarbon-aryl substituent containing from about 6 to about 24 carbon atoms. The most preferred salts within this group are aluminum aryl aliphatic phosphates in which the aliphatic hydrocarbon substituent contains from 6 to 18 carbon atoms.

A partial listing of aluminum phosphate salts constituting additives of the invention includes aluminum phenyl hexadecyl phosphate, aluminum bis(4-dodecylphenyl)phosphate, aluminum 4-dodecylphenyl ethyl phosphate, aluminum tolyl octadecyl phosphate, aluminum phenyl 2-tetradecyl phosphate, aluminum 3-octadecylphenyl phosphate, and aluminum 2-ethylphenyl tetradecyl phosphate.

The aluminum salts which conform to structural formula (2) above can be the aluminum salts of both mono- and diesters having either one or two oxaalkyl substituents, with the term "alkyl" included within the term "oxaalkyl" being used in the generic sense to include straight and branched chain, saturated and unsaturated aliphatic groups. The most preferred salts of this type are the aluminum salts of phosphate diesters in which the oxaalkyl substituent contains from about 16 to about 24 carbon atoms and the second ester substituent in the salt contains from about 1 to about 16 carbon atoms.

A partial listing of aluminum salts constituting compounds of the type contemplated by structural formula (2) above includes: aluminum bis(7,10-dioxadodecyl)phosphate; aluminum 4-methyl-2-oxabutyl hexyldecyl phosphate; aluminum 4,7-dioxanonyl oxadecyl phosphate; aluminum octadecyl 2-oxabutyl phosphate; aluminum bis(14-oxahexadecyl)phosphate; aluminum 3-oxapentyl octadecyl phosphate; aluminum 5-methyl-7,10-dioxadodecyl tetradecyl phosphate; aluminum 11,14-dimethyl 9,12-dioxatetradecyl phosphate and aluminum 6-butyl-12-methyl-10-oxadodecyl hexadecyl phosphate.

Examples of aluminum salts conforming to formula (3) above are the aluminum salts of octylethylorthophosphoric acid ester, propynyldecynylorthophosphoric acid ester, methyltetradecylorthophosphoric acid ester, methyldodecylorthophosphoric acid ester, ethyltetradecylorthophosphoric acid ester and octyldodecylorthophosphoric acid ester.

If a solid aluminum salt is employed, a quantity of a phosphate ester may, if desired, also be admixed with the aged gel in an amount sufficient to react with additional quantities of a basic aluminum compound upon admixture with the aged gel.

Figure 1:
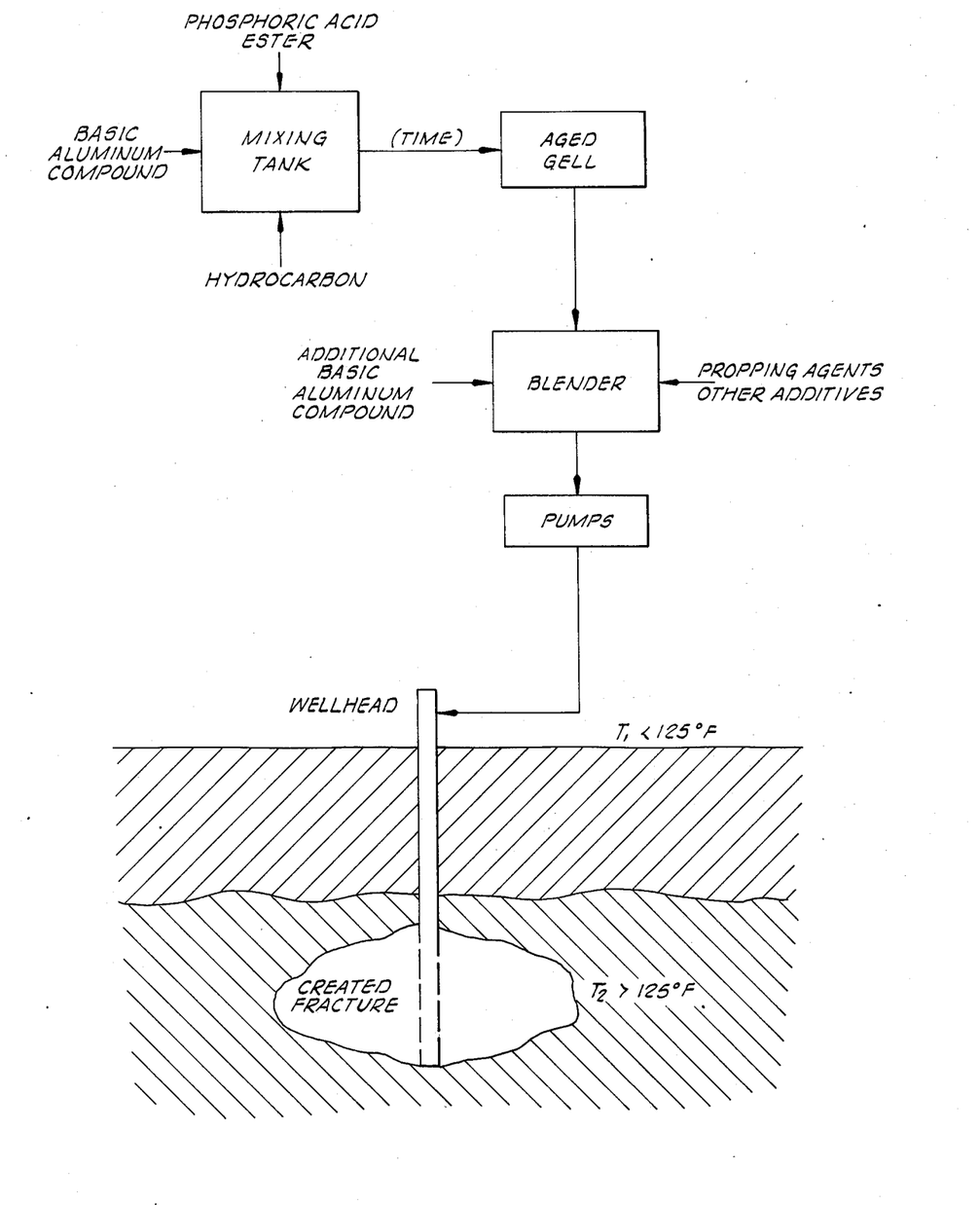

Preferably, the salts are formed in situ in the hydrocarbon liquid by initially adding to the hydrocarbon liquid a phosphate ester in appropriate amount, followed by the addition of a selected quantity of the aluminum compound which is to be reacted therewith to form the aluminum salt. At the time of addition of the aluminum compound to the hydrocarbon, it is beneficial to add a small amount of sodium hydroxide and water. For purposes of illustration, the use of an aliphatic phosphate ester of the type employed as a precursor in the preparation of a compound conforming to structural formula (3) above is referred to in the schematic illustration of the process. It will be understood, of course, that compounds of the sort defined by structural formulae (1) and (2) can also be used pursuant to the process scheme with equal facility.

In the preparation of the aged gel, the phosphate ester and aqueous solution of sodium aluminate or other suitable aluminum compound are added to a mixing tank which contains crude oil, kerosene or diesel, and the aluminum aliphatic phosphate compound is formed in situ in the hydrocarbon liquid. As previously indicated, the amounts of the aluminate and phosphate ester which are added to the hydrocarbon are limited such that, at the ambient temperature at the mixing site and prevailing in the vicinity of the pumps used for pumping the final dispersion downhole, the dispersion formed will be of sufficiently low viscosity that no difficulty in handling and pumping is experienced. That is, the fluid will have an apparent viscosity in the range of from about 100 to about 500 centipoise at a shear rate of 40 sec$^{-1}$. Where an aluminum aliphatic phosphate conforming to structural formula (3) above is utilized, the amounts of aliphatic phosphate ester and aluminate compound added to the hydrocarbon are such that the aluminum salt formed in situ preferably does not exceed a concentration of about 2 weight percent of the fluid. Generally, the phosphoric acid ester will be admixed in an amount of from about 25 pounds to about 200 pounds per 1000 gallons of the aged gel and, most preferably, from about 75 pounds to about 175 pounds per 1000 gallons. The basic aluminum compound initially is admixed in an amount of from about 1 pound to about 15 pounds per 1000 gallons of aged gel and, preferably, from about 1 pound to about 10 pounds per 1000 gallons.

After thoroughly mixing the hydrocarbon and reactants, the mixture is permitted to age for a period in excess of about three minutes. No detrimental effect has been noted when the fluid has been aged in excess of up to about 30 days. During this time, reaction of the ester and aluminate compounds occurs to produce the aluminum salt which is dissolved in the hydrocarbon and the resulting system undergoes an increase in viscosity as the reaction proceeds.

When the aged gel has been prepared in the manner described, the next step of the process of the invention involves adding to this gel an additional quantity of the basic aluminum compound to effect additional crosslinking of the aged gel as it is introduced into the subterranean formation. An additional quantity of from about 0.5 to about 15 pounds per 1000 gallons of aged gel and, preferably, from about 1 to about 10 pounds is added to the aged gel. Typically, the basic aluminum compound is admixed with the aged gel as an aqueous solution containing from about 2 to about 5 pounds of the compound per gallon of solution. The total additional quantity of the basic aluminum compound admixed with the aged gel will depend upon the formation temperature. In this instance, from about 1 to about 5 gallons of the solution are admixed with each 1000 gallons of the aged gel immediately prior to or substantially simultaneously with introduction of the gel into the well bore communicating with the subterranean formation which is to be treated. The addition of the basic aluminum compound to the aged gel will provide the fluid with a viscosity in excess of that otherwise achievable by the aged gel at a temperature in excess of about 125° F.

The addition of the aqueous solution of the basic aluminum compound generally is made at ambient temperature in any suitable blending device. Numerous conventional devices are well known by individuals skilled in the art. The amount of the basic aluminum compound which is used will be determined in part by the ultimate downhole viscosity of the fracturing fluid that is desired and also, in part, by the quantity of propping agent which it may be desired to incorporate in, and have carried by, the hydrocarbon liquid comprising the principal component of the aged gel. Typical propping agents can comprise sand, resin-coated sand, resin-coated sintered bauxite, glass beads, ceramic beads, sintered bauxite and the like. The propping agent typically is admixed with the aged gel in an amount of from about ½ to about 20 pounds per gallon of gel. The propping agent may be admixed with the gel in any suitable conventional blending device. Other types of fracturing fluid additives such as surfactants, corrosion inhibitors and the like well known in the art also can be added to the aged gel when the propping agent is added.

After thoroughly blending the propping agent and any other additives with the aged gel, the additional crosslinking agent is admixed with the gel and pumped into the well bore where it is ultimately caused to enter the subterranean formation which is to be treated. The gelled fluid is pumped at a sufficient rate and pressure to effect a fracture and propagate the same in the subterranean formation. The temperature in the formation is generally higher than the ambient temperature at the well head where the fluid is introduced. The method of the present invention is particularly advantageous when the formation is at a temperature level in excess of about 200° F. and, most particularly, when the temperature is in excess of about 225° F. Surprisingly, it has been found that the method of the present invention will produce a fluid which is capable of maintaining an apparent viscosity in excess of about 100 centipoise at a shear rate of 40 sec$^{-1}$ for in excess of six hours at a temperature in excess of 250° F.

To further illustrate the present invention, and not by way of limitation, the following examples are provided.

EXAMPLE I

The following tests were performed to compare the process of the present invention to the known prior art technique for gelling hydrocarbon fluids. A first example of a crude oil is gelled utilizing the known technique. The sample is placed in a Waring Blender and a quantity of a phosphoric acid ester is admixed with the crude oil in a proportionate amount of about 91 pounds per 1000 gallons of crude oil. A quantity of a basic aluminum compound comprising sodium aluminate then is admixed in a dropwise manner to provide a proportionate amount of about 6.5 pounds per 1000 gallons of crude oil. The fluid then was permitted to continue mixing for about 15 minutes at the maximum rate without significant air entrainment. The fluid then was placed in a tightly sealed glass jar and allowed to age for about 12 hours.

A second sample also is prepared utilizing the above technique in which the proportionate amount of the phosphoric acid ester was about 91 pounds per 1000 gallons of crude oil and the basic aluminum compound was about 10 pounds per 1000 gallons of crude oil.

A third sample is prepared in accordance with the method of the present invention. A quantity of crude oil is placed in the Waring Blender and a quantity of the phosphoric acid ester is admixed with the crude oil in a proportionate amount of about 91 pounds per 1000 gallons of crude oil. A quantity of the basic aluminum compound then is admixed in a dropwise manner to provide a proportionate amount of about 6.5 pounds per 1000 gallons of crude oil. Mixing is continued for about 15 minutes as previously described after which the fluid is aged for about 12 hours as previously described. The aged sample then is returned to the Waring Blender and an additional quantity of the basic aluminum compound is admixed with the aged fluid in an amount sufficient to provide a proportionate amount of about 3.5 pounds per 1000 gallons of aged fluid.

Thereafter, 40 ml aliquots of each of the three samples are tested on a Model 50 Fann Viscometer. The fluid is tested on the viscometer at a 300 rpm sample cup speed using a standard bob. The maximum heating rate is utilized to heat the fluid sample to 250° F. The sample is maintained under a nitrogen gas blanket maintained at a 300 psi overpressure. The data is set forth in the following Tables I, II and III corresponding to samples 1, 2 and 3.

TABLE I

| Temp °F. | Time at Temp. (min.) | Apparent Viscosity at 40 sec$^{-1}$, cp |
|---|---|---|
| 80 | 0 | 368 |
| 250 | 0 | 40 |
| 250 | 30 | 32 |
| 250 | 60 | 29 |
| 250 | 90 | 23 |
| 250 | 120 | 19 |
| 250 | 150 | 15 |
| 250 | 180 | 8 |

TABLE II

| Temp °F. | Time at Temp. (min.) | Apparent Viscosity at 40 sec$^{-1}$, cp |
|---|---|---|
| 80 | 0 | 79 |
| 250 | 0 | 87 |
| 250 | 30 | 117 |
| 250 | 60 | 125 |
| 250 | 90 | 142 |
| 250 | 120 | 132 |
| 250 | 150 | 104 |
| 250 | 180 | 91 |

TABLE III

| Temp °F. | Time at Temp. (min.) | Apparent Viscosity at 40 sec$^{-1}$, cp |
|---|---|---|
| 80 | 0 | 203 |
| 250 | 0 | 168 |
| 250 | 30 | 171 |
| 250 | 60 | 126 |
| 250 | 90 | 108 |
| 250 | 120 | 103 |
| 250 | 150 | 95 |
| 250 | 180 | 95 |

The data set forth above clearly illustrates the superior performance of the fluid of the present invention in comparison to the fluid prepared by prior art techniques.

The fluid produced by the method of the present invention provides sufficient initial viscosity to the gelled hydrocarbon to readily support a propping agent without premature settling in comparison to a prior art fluid containing the same quantity of the gelling agent. The fluid produced by the method of the present invention also exhibits a significantly improved temperature stability in comparison to the fluid prepared in Table I.

EXAMPLE II

To illustrate the utility of the method of the present invention with various hydrocarbon fluids, the following tests were performed. A sample of a hydrocarbon is placed in a Waring Blender together with a quantity of the phosphoric acid ester described in Example I. The ester is admixed with the hydrocarbon in the proportionate amount set forth in each of the following tables. A quantity of the basic aluminum compound then is admixed in a dropwise manner to provide a proportionate amount in pounds per 1000 gallons of hydrocarbon as set forth in each of the following tables. After addition of the aluminum compound, the mixing is continued for about 15 minutes at the maximum rate achievable without casing significant air entrainment. The sample is placed in a tightly sealed glass jar and allowed to age for about 12 hours. The aged sample is returned to the Waring Blender and an additional quantity of the basic aluminum compound is admixed with the aged fluid sample. The aluminum compound is added in a proportionate amount as set forth in the following tables.

Thereafter, a 40 ml aliquot is tested on a Model 50 Fann Viscometer. The fluid is tested on the viscometer at a 300 rpm sample cup speed using a standard bob. The maximum heating rate is utilized to heat the sample to 250° F. The sample is maintained under a nitrogen gas blanket maintained at a 300 psi overpressure. The data from the tests is set forth in the following Tables IV, V, VI, VII and VIII.

TABLE IV

Hydrocarbon: crude oil
Phosphoric acid ester: about 145 pounds/1000 gallons hydrocarbon
Basic aluminum compound: about 7.1 pounds/1000 gallons hydrocarbon
Additional aluminum compound: about 8.3 pounds/1000 gallons hydrocarbon

| Temp, °F. | Time at Temp., Min. | Apparent Viscosity at 40 sec$^{-1}$, cp. |
|---|---|---|
| 75 | 0 | 265 |
| 250 | 0 | 251 |
| 250 | 60 | 350 |
| 250 | 120 | 322 |
| 250 | 180 | 293 |
| 250 | 240 | 265 |
| 250 | 300 | 201 |

TABLE V

Hydrocarbon: crude oil
Phosphoric acid ester: about 127 pounds/1000 gallons hydrocarbon
Basic aluminum compound: about 7.1 pounds/1000 gallons hydrocarbon
Additional aluminum compound: about 5.3 pounds/1000 gallons hydrocarbon

| Temp, °F. | Time at Temp., Min. | Apparent Viscosity at 40 sec$^{-1}$, cp. |
|---|---|---|
| 75 | 0 | 525 |
| 250 | 0 | 206 |
| 250 | 60 | 180 |
| 250 | 120 | 193 |
| 250 | 180 | 172 |
| 250 | 360 | 157 |
| 250 | 450 | 135 |

TABLE VI

Hydrocarbon: kerosene
Phosphoric acid ester: about 145 pounds/1000 gallons hydrocarbon
Basic aluminum compound: about 7.1 pounds/1000 gallons hydrocarbon
Additional aluminum compound: about 7.1 pounds/1000 gallons hydrocarbon

| Temp, °F. | Time at Temp., Min. | Apparent Viscosity at 40 sec$^{-1}$, cp. |
|---|---|---|
| 75 | 0 | 349 |
| 250 | 0 | 204 |
| 250 | 60 | 251 |
| 250 | 121 | 283 |
| 250 | 181 | 276 |
| 250 | 240 | 264 |
| 250 | 300 | 243 |
| 250 | 360 | 230 |

TABLE VII

Hydrocarbon: diesel
Phosphoric acid ester: about 127 pounds/1000 gallons hydrocarbon
Basic aluminum compound: about 5.9 pounds/1000 gallons hydrocarbon
Additional aluminum compound: about 7.1 pounds/1000 gallons hydrocarbon

| Temp, °F. | Time at Temp., Min. | Apparent Viscosity at 40 sec$^{-1}$, cp. |
|---|---|---|
| 80 | 0 | 116 |
| 250 | 0 | 311 |
| 250 | 60 | 285 |
| 250 | 120 | 253 |
| 250 | 180 | 224 |
| 250 | 240 | 203 |
| 250 | 300 | 185 |
| 250 | 360 | 162 |
| 250 | 420 | 147 |
| 250 | 600 | 128 |
| 250 | 696 | 108 |

TABLE VIII

Hydrocarbon: jet fuel
Phosphoric acid ester: about 145 pounds/100 gallons hydrocarbon
Basic aluminum compound: about 7.1 pounds/1000 gallons hydrocarbon
Additional aluminum compound: about 8.3 pounds/1000 gallons hydrocarbon

| Temp, °F. | Time at Temp., Min. | Apparent Viscosity at 40 sec$^{-1}$, cp. |
|---|---|---|
| 80 | 0 | 189 |
| 250 | 0 | 215 |
| 250 | 30 | 351 |
| 250 | 60 | 361 |
| 250 | 120 | 256 |
| 250 | 180 | 226 |
| 250 | 240 | 192 |

The data set forth above clearly illustrates the beneficial results obtained by practice of the process of the present invention.

EXAMPLE III

To illustrate the effect of the method of the present invention and the effect the concentration of the basic aluminum compound has upon the viscosity of the fluid, the following tests were performed. A sample of crude oil is placed in a Waring Blender together with a quantity of the phosphoric acid ester described in Example I. The ester is admixed with the crude in a proportionate amount of about 109 pounds per 1000 gallons of crude. A quantity of the basic aluminum compound then is admixed in a dropwise manner with the crude to provide a proportionate amount of about 5.9 pounds per 1000 gallons of crude. After addition of the aluminum compound, the mixing is continued for about 15 minutes at the maximum rate achievable without causing significant air entrainment. The sample is placed in a tightly sealed gas jar and allowed to age for about 12 hours. Aliquots of the aged sample are admixed with an additional quantity of the basic aluminum compound in the proportionate amount as set forth in the following tables.

Thereafter, 40 ml. of the fluid sample is tested on a Model 50 Fann Viscometer. The fluid is tested on the viscometer at a 300 rpm sample cup speed using a standard bob. The maximum heating rate is utilized to heat the sample to 250° F. The sample is maintained under a nitrogen gas blanket maintained at a 300 psi overpressure. The data from the tests is set forth in the following Tables IX, X, XI, XII, XIII, XIV and XV.

TABLE IX

Additional basic aluminum compound, about 3 pounds/1000 gallons crude

| Temp °F. | Time at Temp. (min.) | Apparent Viscosity at 40 sec$^{-1}$, cp |
|---|---|---|
| 75 | 0 | 409 |
| 250 | 0 | 156 |
| 250 | 60 | 79 |
| 250 | 120 | 64 |
| 250 | 150 | 60 |

TABLE X

Additional basic aluminum compound, about 3.55 pounds/1000 gallons crude

| Temp °F. | Time at Temp. (min.) | Apparent Viscosity at 40 sec$^{-1}$, cp |
|---|---|---|
| 75 | 0 | 449 |
| 250 | 0 | 97 |
| 250 | 60 | 66 |
| 250 | 120 | 77 |
| 250 | 181 | 63 |

TABLE XI

Additional basic aluminum compound, about 4.15 pounds/1000 gallons crude

| Temp °F. | Time at Temp. (min.) | Apparent Viscosity at 40 sec$^{-1}$, cp |
|---|---|---|
| 75 | 0 | 402 |
| 250 | 0 | 163 |
| 250 | 60 | 211 |
| 250 | 120 | 206 |
| 250 | 180 | 176 |
| 250 | 240 | 156 |

TABLE XII

Additional basic aluminum compound, about 4.75 pounds/1000 gallons crude

| Temp °F. | Time at Temp. (min.) | Apparent Viscosity at 40 sec$^{-1}$, cp |
|---|---|---|
| 75 | 0 | 183 |
| 250 | 0 | 151 |
| 250 | 60 | 159 |
| 250 | 120 | 164 |
| 250 | 180 | 156 |
| 250 | 240 | 147 |
| 250 | 285 | 143 |

TABLE XIII

Additional basic aluminum compound, about 5.3 pounds/1000 gallons crude

| Temp °F. | Time at Temp. (min.) | Apparent Viscosity at 40 sec$^{-1}$, cp |
|---|---|---|
| 75 | 0 | 147 |
| 250 | 0 | 84 |
| 250 | 60 | 130 |
| 250 | 120 | 154 |
| 250 | 180 | 144 |
| 250 | 240 | 121 |

TABLE XIV

Additional basic aluminum compound, about 5.9 pounds/1000 gallons crude

| Temp °F. | Time at Temp. (min.) | Apparent Viscosity at 40 sec$^{-1}$, cp |
|---|---|---|
| 75 | 0 | 168 |
| 250 | 0 | 62 |
| 250 | 60 | 104 |
| 250 | 120 | 133 |
| 250 | 180 | 140 |
| 250 | 241 | 140 |
| 250 | 272 | 143 |

TABLE XV

Additional basic aluminum compound, about 6.5 pounds/1000 gallons crude

| Temp °F. | Time at Temp. (min.) | Apparent Viscosity at 40 sec$^{-1}$, cp |
|---|---|---|
| 75 | 0 | 56 |
| 250 | 0 | 46 |
| 250 | 62 | 139 |
| 250 | 120 | 175 |

The data clearly illustrates the potential benefits to be derived from use of the method of the present invention. The present invention can be used to provide a fluid which is stable at elevated temperatures and thereby capable of supporting significant quantities of a propping agent. Known fluids having a similar viscosity at the elevated temperature of the formation have a viscosity at ambient temperature which makes them virtually impossible to pump from their containers into the subterranean formation. It is believed that, in the practice of the present invention, the solubility of the aluminum phosphate ester reaction product in the hydrocarbon increases as the temperature of the fluid increases. The method of the present invention permits the maintenance of a relatively constant viscosity in a fluid during heating or the ability to build viscosity in the fluid without the addition of more gelling agent to the fluid.

From the foregoing description of the invention, it will be perceived that a useful, relatively easily practiced method for fracturing subterranean formations has been proposed, and contemplates the usage of a substantially temperature stable fracturing fluid which is suitable for use at relatively elevated bottom hole temperatures. Although certain specific embodiments of the invention have been herein described in order to clearly illustrate the basic principles which underlie the invention, and to provide sufficient guidance to those skilled in the art to enable them to practice the invention without difficulty, it will be understood that various changes and alterations in the exemplary compositions and methods which are set forth herein can be effected without departure from the spirit or scope of the invention. Changes and innovations of this type are therefore deemed to be circumscribed by the spirit and scope of the invention, except as the same may be necessarily limited by the appended claims.

What is claimed is:

1. A method for fracturing a subterranean formation having an elevated temperature comprising:

adding at a temperature of less than about 125° F. to a hydrocarbon liquid, a phosphoric acid ester in an amount sufficient to provide a concentration of from about 25 to about 200 pounds of ester per 1000 gallons of hydrocarbon liquid and a basic aluminum compound in an amount sufficient to provide a concentration of from about 1 to about 15 pounds of said compound per 1000 gallons of hydrocarbon liquid to form, in situ, at least one aluminum salt selected from the group having the structural formulae:

(1)

where
a = 0 to 2,
b = 1 to 3,
and the sum of a+b = 3;

$R_1$ = a phenyl or aliphatic hydrocarbon substituted-phenyl group containing from 6 to 24 carbon atoms, and $R_2$ = a phenyl, aliphatic hydrocarbon substituted-phenyl or aliphatic hydrocarbon group containing from 1 to 24 carbon atoms, or H; provided, however, that where $R_1$ is an phenyl group, then $R_2$ must be either an aliphatic hydrocarbon group containing at least six carbon atoms, or an aliphatic hydrocarbon substituted-phenyl group containing at least twelve carbon atoms; and provided that if $R_2$ is a phenyl group, then $R_1$ is an aliphatic hydrocarbon substituted-phenyl group containing at least 12 carbon atoms; and provided that if both $R_1$ and $R_2$ are aliphatic hydrocarbon substituted-phenyl groups; one of $R_1$ and $R_2$ contains at least 12 carbon atoms; and provided that where $R_1$ is an aliphatic hydrocarbon substituted-phenyl containing less than 12 carbon atoms and $R_2$ is aliphatic hydrocarbon, $R_2$ must contain at least six carbon atoms; and

(2)

where
a = 0 to 2,
b = 1 to 3,
c = 1 to 5,
d = 1 to 5,
and the sum of a+b = 3;

$R_1O$ and $R_3O$ = an alkyloxy, alkenyloxy or alkynyloxy group containing from 1 to 18 carbon atoms, or $CH_2CH(CH_3)O$, or $CH_2CH_2O$, and $R_2O$ and $R_4O$ = an alkyloxy, alkenyloxy or alkynyloxy group containing from 1 to 18 carbon atoms, and wherein $R_1O$ and $R_2O$ may differ from each other but shall together contain from 1 to 24 carbon atoms, and $R_3O$ and $R_4O$ may differ from each other but shall together contain from 1 to 20 carbon atoms, provided that at least one of $R_1O$ and $R_3O$ shall be either $CH_2CH(CH_3)O$ or $CH_2CH_2O$ and provided further that where either $R_1O$ or $R_3O$ is neither $CH_2CH(CH_3)O$ nor $CH_2CH_2O$, then the respective $R_2O$ or $R_4O$ group otherwise bonded thereto shall be deleted; and (3)

where
m = 1 to 3,
n = 0 to 2,
and the sum of n+m = 3; and

R and $R_1$ are independently $C_1$ to $C_{20}$ alkyls, or $C_2$ to $C_{20}$ alkenyls, or $C_2$ to $C_{20}$ alkynyls, or R or $R_1$, but not both, may be H; provided, however, that where either R or $R_1$ contains fewer than six carbon atoms, then the other of R or $R_1$ contains at least seven carbon atoms whereby the liquid hydrocarbon is caused to form a pumpable initial gel;

aging said initial gel for a period of at least about twelve hours whereby said gel is caused to develop an initial apparent viscosity in the range of from about 100 to about 500 centipoise at a shear rate of 40 $sec^{-1}$;

adding to said aged initial gel, at a temperature below about 125° F., as an aqueous solution containing an additional quantity of a basic aluminum compound in an amount in the range of from about 0.5 to about 15 pounds per 1000 gallons of hydrocarbon liquid to react with said ester to effect additional gelling of said pumpable initial gel;

introducing said aged initial gel containing said additional basic aluminum compound into a well bore communicating with a subterranean formation having a temperature in excess of about 125° F. substantially simultaneously with said addition of said additional basic aluminum compound whereby said fluid is heated during said additional gelling to form a gelled fluid having a viscosity in the formation sufficient to transport a propping agent into a created fracture in said subterranean formation; and fracturing said formation with said introduced gel.

2. The method of claim 1 wherein a solid particulate is admixed with at least a portion of said initial gel in an amount of from about ½ pound to about 20 pounds per gallon of said gel.

3. The method of claim 1 wherein said hydrocarbon comprises at least one member selected from the group consisting of diesel, kerosene, fuel oil, gas oil and crude oil.

4. The method of claim 1 wherein the basic aluminum compound comprises sodium aluminate.

5. A method for fracturing a subterranean formation having an elevated temperature comprising:

adding at a temperature of less than about 125° F. to a hydrocarbon liquid, a phosphoric acid ester in an amount sufficient to provide a concentration of from about 25 to about 200 pounds of ester per 1000 gallons of hydrcarbon liquid and a basic aluminum compound in an amount sufficient to provide a concentration of from about 1 to about 15 pounds of said compound per 1000 gallons of hydrocarbon liquid to form, in situ, at least one aluminum salt selected from the group having the structural formulae:

(1)

where
a=0 to 2,
b=1 to 3,
and the sum of a+b=3;
$R_1$=a phenyl or aliphatic hydrocarbon substituted-phenyl group containing from 6 to 24 carbon atoms, and
$R_2$=a phenyl, aliphatic hydrocarbon substituted-phenyl or aliphatic hydrocarbon group containing from 1 to 24 carbon atoms, or H; provided, however, that where $R_1$ is an phenyl group, then $R_2$ must be either an aliphatic hydrocarbon group containing at least six carbon atoms, or an aliphatic hydrocarbon substituted-phenyl group containing at least twelve carbon atoms; and provided that if $R_2$ is a phenyl group, then $R_1$ is an aliphatic hydrocarbon substituted-phenyl group containing at least 12 carbon atoms; and provided that if both $R_1$ and $R_2$ are aliphatic hydrocarbon substituted-phenyl groups; one of $R_1$ and $R_2$ contains at least 12 carbon atoms; and provided that where $R_1$ is an aliphatic hydrocarbon substituted-phenyl containing less than 12 carbon atoms and $R_2$ is aliphatic hydrocarbon, $R_2$ must contain at least six carbon atoms; and (2)

where
a=0 to 2,
b=1 to 3,
c=1 to 5,
d=1 to 5,
and the sum of a+b=3;
$R_1O$ and $R_3O$=an alkyloxy, alkenyloxy or alkynyloxy group containing from 1 to 18 carbon atoms, or $CH_2CH(CH_3)O$, or $CH_2CH_2O$, and
$R_2O$ ad $R_4O$=an alkyloxy, alkenyloxy or alkynyloxy group containing from 1 to 18 carbon atoms, and wherein
$R_1O$ and $R_2O$ may differ from each other but shall together contain from 1 to 24 carbon atoms, and $R_3O$ and $R_4O$ may differ from each other but shall together contain from 1 to 20 carbon atoms, provided that at least one of $R_1O$ and $R_3O$ shall be either $CH_2CH(CH_3)O$ or $CH_2CH_2O$ and provided further that where either $R_1O$ or $R_3O$ is neither $CH_2CH(CH_3)O$ nor $CH_2CH_2O$, then the respective $R_2O$ or $R_4O$ group otherwise bonded thereto shall be deleted; and (3)

where
m=1 to 3,
n=0 to 2,
and the sum of n+m=3; and
R and $R_1$ are independently $C_1$ to $C_{20}$ alkyls, or $C_2$ to $C_{20}$ alkenyls, or $C_2$ to $C_{20}$ alkynyls, or R or $R_1$, but not both, may be H; provided, however, that where either R or $R_1$ contains fewer than six carbon atoms, then the other of R or $R_1$ contains at least seven carbon atoms whereby the liquid hydrocarbon is caused to form a pumpable initial gel;
aging said initial gel for a period of at least about twelve hours whereby said gel is caused to develop an initial apparent viscosity in the range of from about 100 to about 500 centipoise at a shear rate of 40 sec$^{-1}$;
adding to said aged initial gel, at a temperature below about 125° F., an additional quantity of a basic aluminum compound comprising sodium aluminate in an amount in the range of from about 0.5 to about 15 pounds per 1000 gallons of hydrocarbon liquid to react with said ester to effect additional gelling of said pumpable aged initial gel and form a pumpable high viscosity gelled liquid; and
introducing said pumpable high viscosity gelled liquid into a formation having a temperature above about 125° F. under pressure sufficient to accomplish fracturing of said elevated temperature formation whereby said high viscosity gelled liquid maintains sufficient viscosity as it undergoes viscosity reduction as a result of heating in said formation that it remains capable of transporting a propping agent into the fracture created by said liquid.

6. The method of claim 5 wherein the additional quantity of basic aluminum compound is admixed as an aqueous solution with said initial gel.

7. The method of claim 5 wherein a solid particulate is admixed with at least a portion of said initial gel in an amount of from about ½ pound to about 20 pounds per gallon of said gel.

8. The method of claim 5 wherein said hydrocarbon comprises at least one member selected from the group consisting of diesel, kerosene, fuel oil, gas oil and crude oil.

9. A method for fracturing a subterranean formation at a location where the temperature exceeds about 200° F. comprising:
adding at a temperature of less than about 125° F. to a hydrocarbon liquid, a phosphoric acid ester in an amount sufficient to provide a concentration of from about 25 to about 200 pounds of ester per 1000 gallons of hydrocarbon liquid and a basic aluminum compound in an amount sufficient to provide a concentration of from about 1 to about 15 pounds of said compound per 1000 gallons of hydrocarbon liquid to form, in situ, at least one aluminum salt selected from the group having the structural formulae:

(1)

where
a = 0 to 2,
b = 1 to 3,
and the sum of a + b = 3;
$R_1$ = a phenyl or aliphatic hydrocarbon substituted-phenyl group containing from 6 to 24 carbon atoms, and
$R_2$ = a phenyl, aliphatic hydrocarbon substituted-phenyl or aliphatic hydrocarbon group containing from 1 to 24 carbon atoms, or H; provided, however, that where $R_1$ is an phenyl group, then $R_2$ must be either an aliphatic hydrocarbon group containing at least six carbon atoms, or an aliphatic hydrocarbon substituted-phenyl group containing at least twelve carbon atoms; and provided that if $R_2$ is a phenyl group, then $R_1$ is an aliphatic hydrocarbon substituted-phenyl group containing at least 12 carbon atoms; and provided that if both $R_1$ and $R_2$ are aliphatic hydrocarbon substituted-phenyl groups; one of $R_1$ and $R_2$ contains at least 12 carbon atoms; and provided that where $R_1$ is an aliphatic hydrocarbon substituted-phenyl containing less than 12 carbon atoms and $R_2$ is aliphatic hydrocarbon, $R_2$ must contain at least six carbon atoms; and (2)

where
a = 0 to 2,
b = 1 to 3,
c = 1 to 5,
d = 1 to 5,
and the sum of a + b = 3;
$R_1O$ and $R_3O$ = an alkyloxy, alkenyloxy or alkynyloxy group containing from 1 to 18 carbon atoms, or $CH_2CH(CH_3)O$, or $CH_2CH_2O$, and
$R_2O$ and $R_4O$ = an alkyloxy, alkenyloxy or alkynyloxy group containing from 1 to 18 carbon atoms, and wherein
$R_1O$ and $R_2O$ may differ from each other but shall together contain from 1 to 24 carbon atoms, and $R_3O$ and $R_4O$ may differ from each other but shall together contain from 1 to 20 carbon atoms, provided that at least one of $R_1O$ and $R_3O$ shall be either $C_2CH(CH_3)O$ or $CH_2CH_2O$ and provided further that where either $R_1O$ or $R_3O$ is neither $CH_2CH(CH_3)O$ nor $CH_2CH_2O$, then the respective $R_2O$ or $R_4O$ group otherwise bonded thereto shall be deleted; and (3)

where
m = 1 to 3,
n = 0 to 2,
and the sum of n + m = 3; and
R and $R_1$ are independently $C_1$ to $C_{20}$ alkyls, or $C_2$ to $C_{20}$ alkenyls, or $C_2$ to $C_{20}$ alkynyls, or R or $R_1$, but not both, may be H; provided, however, that where either R or $R_1$ contains fewer than six carbon atoms, then the other of R or $R_1$ contains at least seven carbon atoms whereby the liquid hydrocarbon is caused to form a pumpable initial gel;
aging said initial gel for a period of at least twelve hours whereby said gel is caused to develop an initial apparent viscosity in the range of from about 100 to about 500 centipoise at a shear rate of 40 $sec^{-1}$;
admixing a propping agent with at least a portion of said aged initial gel in an amount of from about ½ to about 20 pounds per gallon of initial gel;
adding to said aged initial gel, at a temperature below about 125° F., as an aqueous solution an additional quantity of a basic aluminum compound in an amount in the range of from about 0.5 to about 15 pounds per 1000 gallons of hydrocarbon liquid to react with said ester to effect additional gelling of said pumpable initial gel to form a pumpable high viscosity gelled liquid;
introducing said pumpable high viscosity gelled liquid into a formation having a temperature above about 125° F. under pressure sufficient to accomplish fracturing of said elevated temperature formation; and
depositing at least a portion of said propping agent in the fracture produced by said pumpable high viscosity gelled liquid.

10. The method of claim 9 wherein said basic aluminum compound is sodium aluminate.

11. The method of claim 9 wherein said basic aluminum compound is present in an amount of from about 1 to about 10 pounds per 1000 gallons of said initial gel prior to admixing with an additional quantity of a basic aluminum compound to form said high viscosity gelled liquid.

12. The method of claim 9 wherein said phosphoric acid ester is present in an amount of from about 75 to about 175 pounds per 1000 gallons of said initial gel.

13. The method of claim 9 wherein the additional quantity of basic aluminum compound added to said gel is an amount in the range of from about 1 to about 10 pounds.

* * * * *